April 19, 1932. C. E. HUTTON 1,854,697
ATTACHMENT FOR CULTIVATORS
Filed Aug. 29, 1931 2 Sheets-Sheet 1
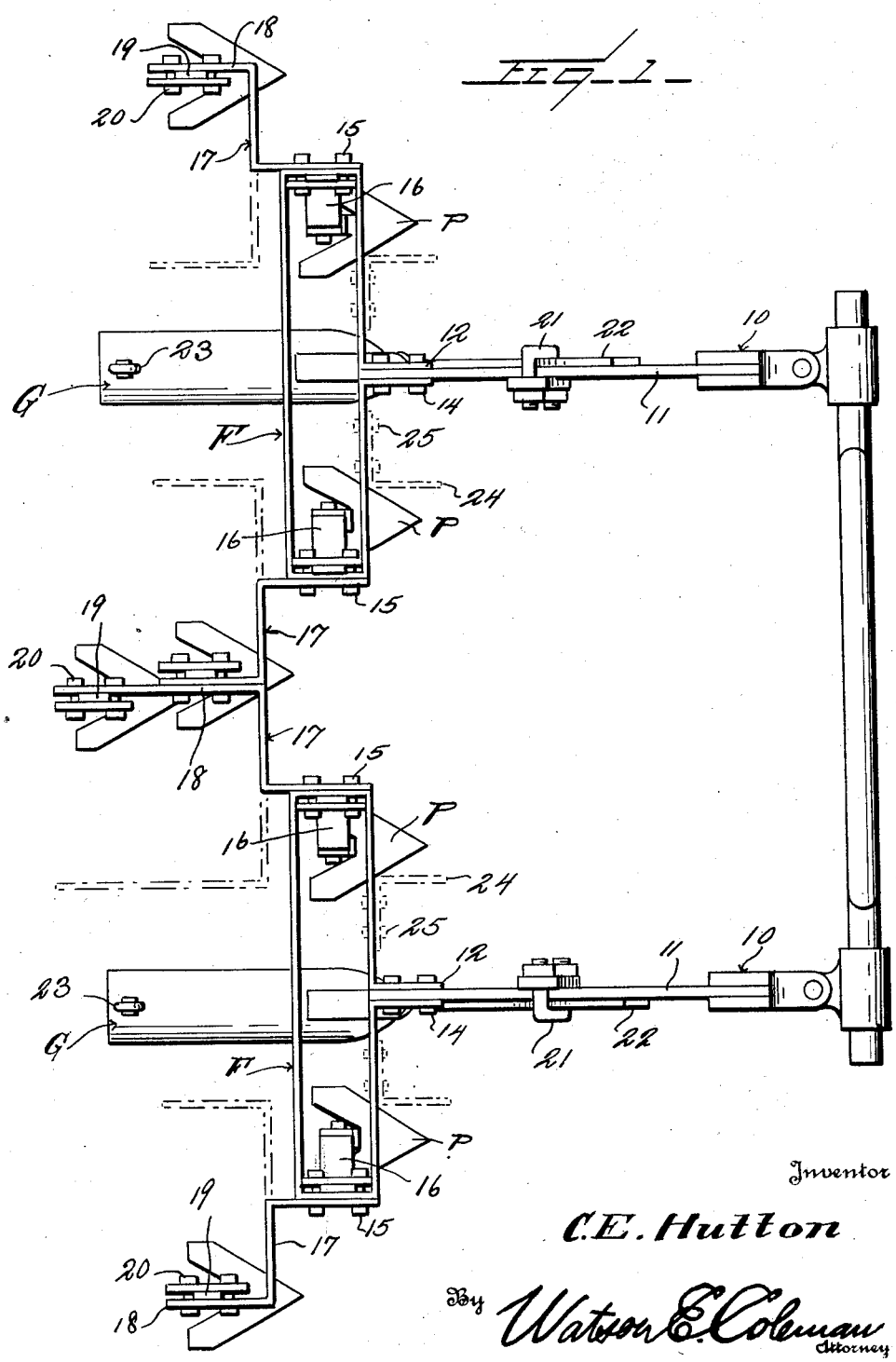
Inventor
C.E. Hutton
By Watson E. Coleman
Attorney April 19, 1932.                    C. E. HUTTON                    1,854,697
                              ATTACHMENT FOR CULTIVATORS
                       Filed Aug. 29, 1931          2 Sheets-Sheet 2
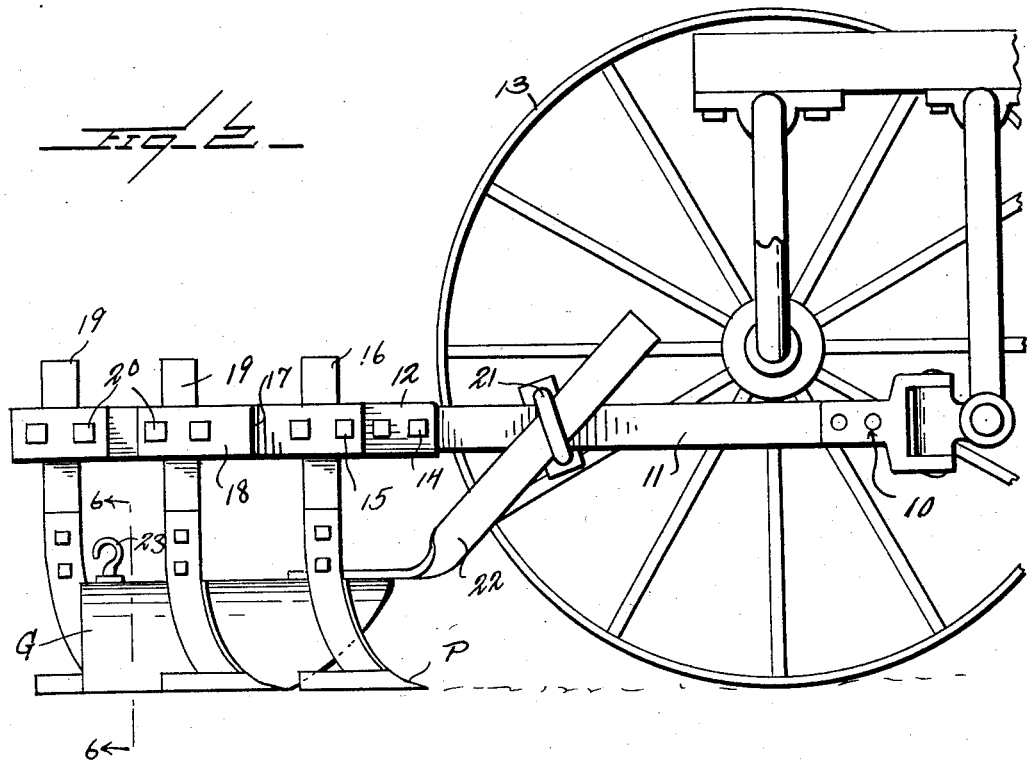
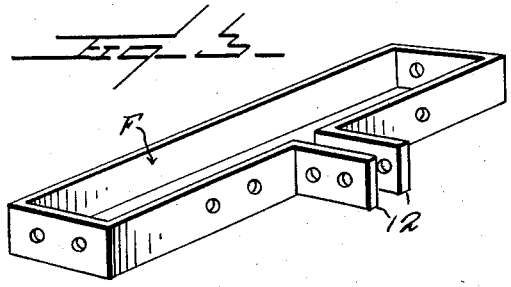
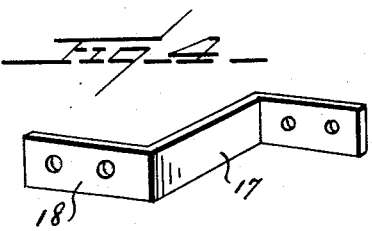
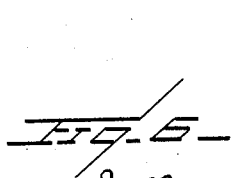
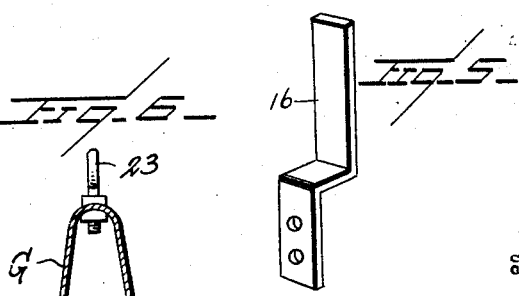
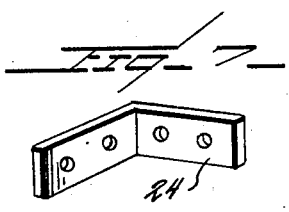
Inventor
C. E. Hutton
By Watson E. Coleman
Attorney Patented Apr. 19, 1932

1,854,697

UNITED STATES PATENT OFFICE

CLYDE E. HUTTON, OF DILL, OKLAHOMA

ATTACHMENT FOR CULTIVATORS

Application filed August 29, 1931. Serial No. 560,172.

This invention relates to farming implements, and more particularly to attachments for cultivators.

An object of this invention is to provide attachments for cultivators of the single row type whereby the single row cultivator can be converted into a twin or two row cultivator.

Another object of this invention is to provide attachments of this kind which can be mounted in various positions on the cultivator one part with respect to another so that various earth working implements may be carried by the attachments in desired operative position.

A further object of this invention is to provide attachments of this kind which can be readily and cheaply manufactured and which are so constructed that they can be mounted on any conventional cultivator without permanent alteration of any of the parts thereof.

The above and various other objects and advantages of this invention will in part be described in and in part be understood from the following detailed description of the present preferred embodiment, the same being illustrated in the accompanying drawings, wherein:—

Figure 1 is a detail top plan view of a portion of a cultivator frame having a device constructed according to the preferred embodiment of this invention mounted thereon;

Figure 2 is a detail side elevation of the cultivator frame with the attachments;

Figure 3 is a detail perspective view of the supporting frame for the earth working implements;

Figure 4 is a detail perspective view of one of the Z-shaped shank supporting members;

Figure 5 is a detail perspective view of one of the shank members;

Figure 6 is a sectional view taken on the line 6—6 of Figure 2;

Figure 7 is a detail perspective view of one of the L-shaped tool supporting members.

Referring to the drawings wherein like numerals of reference designate corresponding parts throughout the several views, the numeral 10 designates generally a farm implement frame structure having rearwardly extending parallel arms 11. The frame structure 10 is supported for movement by means of wheels 13 or the like, and may be drawn by either animals or tractor. Ordinarily, the rearwardly extending arms 11 have attached thereto cultivating plows or disks, so as to loosen up the ground as the frame 10 is moved forwardly, and these plows are disposed between a pair of rows of vegetables, grain or the like.

In order to provide means whereby two or more rows may be cultivated at the same time and with the same implement frame 10, I have provided a tool supporting frame, generally designated as F which comprises a substantially rectangular-shaped frame having forwardly extending arms 12 disposed in spaced parallel relation to each other and engaging on opposite sides of the bar 11 and held in position by means of bolts 14 or the like.

These arms 12 are disposed at substantially the central point of one side of the frame F. The frame F at each end thereof is provided with suitable spaced apertures for receiving securing bolts 15 or the like so as to secure Z-shaped shank members 16 in depending relation from each end of the frame F, these shank members 16 being adapted to have plow members P secured thereto. By providing these shank members 16 in Z-shaped form, one portion of the shank member 16 is offset from the other so that the plows P may be positioned in desired spaced relation to each other and to the row which is being cultivated.

A Z-shaped shank supporting member generally designated as 17 is secured to the frame F, as shown in Figure 1, one Z-shaped member 17 being secured to one end and another secured to the opposite end by the bolts 15 which also hold the shank members 16 in adjusted position on the frame F. The offset leg portion 18 of the shank supporting member 17 has bolted, or otherwise secured thereto, a depending shank 19 which may be in straight form and held in position on the shank supporting leg 18 by means of bolts 20 or the like. This shank supporting leg 18 is preferably disposed in parallel relation to the parallel bars 11 and the plow attached to the shank 19 will be positioned in outwardly spaced relation to the intermediate plow carried by the shank 16. A plant fender or guard G is secured to the bar 11 by means of a U-bolt 21 which engages a strap 22 carried by the forward end of the guard G. The rear end of the guard G is provided with an eye or loop 23 for receiving a chain or other supporting flexible member so as to support the rear end of this guard G in desired position.

The inner end of opposing frame members F have attached thereto the Z-shaped shank supporting members 17 which are positioned in abutting relation to each other and have the shank supporting leg 18 of each member thereof contacting one with another so as to support a pair of plow members in longitudinally spaced relation one with another or in other words, to support one plow rearwardly of another and preferably to one side thereof.

It will be obvious, from the foregoing, that the frame F with the shank supporting members 17, may be secured to the implement frame 10 in a position to overlie a row of plants so that plow members or cultivating implements may be secured to the frame F on each side of the row of plants and where the implement frame 10 is provided with only one rearwardly extending bar 11, the row of plants may be cultivated on each side at the same time.

It will also be obvious that various other positions may be assumed by the shank supporting members 17, as shown in dotted line in Figure 1, and in like manner, the L-shaped shank supporting members 24, which are bolted or otherwise secured to the frame F by means of bolts 25 or the like, may be secured in any desired position with respect to the frame F, so as to support the desired tools or implements therefrom.

The L-shaped shank supporting members 24 are secured in opposed relation to each other and on opposite sides of the bar 11, as shown in dotted line in Figure 1, but I, of course, do not wish to be limited to this construction as these L-shaped shank supporting members may be secured in any other desired relation one to another. These L-shaped shank supporting members 24 may have attached thereto either disk carrying shanks or other desired implements.

In the use of these attachments, the conventional implements mounted on the parallel frame members 11 are removed therefrom, these implements being ordinarily bolted or otherwise removably secured to the frame members 11 and a frame member F secured at the rear end of the bars 11, the frame F extending transversely of the longitudinal axis of the bars 11. The inner ends of the frames F are secured to each other by reverting the shank supporting members 17 so that the shank supporting legs 18 will contact one with another and in addition to securing the inner ends of the frames F together, these shank supporting members 18 may have attached thereto suitable implements in the form of plows or the like. The frame F, with the shank supporting members 17 and 24 and the shanks 16, are rigidly secured to the frame members 11 so that they can be vertically rocked coactive with the vertical rocking movement of these frame members 11.

It will be obvious, from the foregoing, that a cultivator which has been designed for cultivating only a single row of plants can be readily converted into a double or twin row cultivator so that two rows of plants can be cultivated at the same time, thereby saving the cost of purchasing an entire new frame 10 with the plows attached thereto.

While a cultivator having the attachments hereinbefore described may be used for cultivating or loosening the dirt during the growing period of the plants, the shank supporting members may be so positioned on the frame F that the plow members may be used also to dig up the plants during the harvest season. The plow members and disks may be mounted on the frame F in relatively close proximity to each other so that where the surface of the ground is relatively hard or crusted, it can be readily broken up into fine particles so as to permit the moisture to readily enter the ground to a greater depth.

It is, of course, understood that various changes and modifications may be made in the details of construction and design of the above specifically described embodiment of this invention without departing from the spirit thereof, such changes and modifications being restricted only by the scope of the following claim.

What is claimed is:—

An attachment for a cultivator comprising a pair of tool supporting frame structures, means for securing each of said frame structures to the cultivator in a position one on each side of the center of the cultivator, means for securing the inner ends of the frame structures together to provide a unitary rigid structure, said latter means comprising a pair of Z-shaped members each having one end portion secured to the inner end of a frame structure and having their opposite ends secured together and extending longitudinally of the cultivator to provide shovel supporting means.

In testimony whereof I hereunto affix my signature.

CLYDE E. HUTTON.